(12) United States Patent
Hale

(10) Patent No.: US 6,442,582 B1
(45) Date of Patent: Aug. 27, 2002

(54) MULTIPLIER CARRY BIT COMPRESSION APPARATUS AND METHOD

(75) Inventor: Stephen C. Hale, San Jose, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/335,351

(22) Filed: Jun. 17, 1999

(51) Int. Cl.[7] .............................................. G06F 7/52
(52) U.S. Cl. ...................................................... 708/629
(58) Field of Search ........................................ 708/629

(56) References Cited

U.S. PATENT DOCUMENTS 5,808,928 A * 9/1998 Miyoshi ..................... 708/629
5,944,776 A * 8/1999 Zhang et al. ............... 708/629
6,249,799 B1 * 6/2001 Purcell et al. .............. 708/629
6,308,195 B1 * 10/2001 Hirase et al. ............... 708/629

* cited by examiner

Primary Examiner—David H. Malzahn
(74) Attorney, Agent, or Firm—Vedder, Price, Kaufman & Kammholz

(57) ABSTRACT

A multiplier carry bit compression apparatus and method for a multiplier using Wallace tree addition structures uses a plurality of early and late carry bit compression operations for each level of the Wallace tree addition structure. For each level in a Wallace tree addition structure, each early carry bit compression operation compresses early compression bits prior to each corresponding late carry bit compression operation that compresses late carry bits.

17 Claims, 3 Drawing Sheets

US 6,442,582 B1

MULTIPLIER CARRY BIT COMPRESSION APPARATUS AND METHOD

RELATED CO-PENDING APPLICATION

This is a related application to co-pending application entitled "A Selective Carry Boundary" having inventors Steven Clark Purcell and Nitel Patwa, having U.S. Ser. No. 09/099,850, filed Jun. 19, 1998, now U.S. Pat. No. 6,249,799, owned by instant assignee and incorporated herein by reference.

FIELD OF THE INVENTION

The invention relates generally to arithmetic logic units (ALU) and more particularly to arithmetic logic units that perform multiplication and accumulate operations using multipliers having Wallace tree addition structures.

BACKGROUND OF THE INVENTION

The multiplication and accumulation (MAC) operation is a common operation performed in arithmetic logic units. ALUs are typically used in microprocessors and other processing units. A conventional MAC structure may have a multiplier of 16 bits for example, and an accumulator with a much larger bit size such as 64 bits or 128 bits. Such MAC structure may use Wallace tree structures to produce the intermediate product term. An additional carry save adder is used to combine the intermediate product with the contents of the accumulator. A carry propagate add operation is used to obtain the final MAC result. MAC structures may be required to process signed and unsigned values. However, multiplying and accumulating unsigned values may require a larger multiplier structure to allow intermediate product terms to be extended to the proper accumulator size (format). This larger structure can result in larger sized multipliers resulting in higher cost dies and higher power dissipation.

In addition, MAC operations can require a saturating addition or a normal addition. A saturation condition may result when the MAC size is exceeded due to the oversize of the result. The saturation condition is determined by the carry out of the final addition. However, the addition may also produce a carry due to the extension of the intermediate product into the proper accumulator size. A distinction has to be made so that the data is not misinterpreted.

Consequently, there exists a need for a multiplier carry bit compression apparatus and method for a multiplier using Wallace tree addition structures that facilitates a reduction is multiplier size and facilitates saturating MAC operation.

BRIEF DESCRIPTION OF THE DRAWINGS

The below-described invention will be more fully understood in view of the below identified drawings wherein:

FIG. 2b is a continuation of the flow chart of FIG. 2a.

DETAILED DESCRIPTION OF A PREFERRED EMBODIMENT OF THE INVENTION

Briefly, a multiplier carry bit compression apparatus and method for a multiplier using Wallace tree addition structures uses a plurality of early and late carry bit compression operations for each level of the Wallace tree addition structure. For each of at least the first two levels in a Wallace tree addition structure (having for example three levels), each early carry bit compression operation compresses early compression bits prior to each corresponding late carry bit compression operation that compresses late carry bits.

Figure 1:
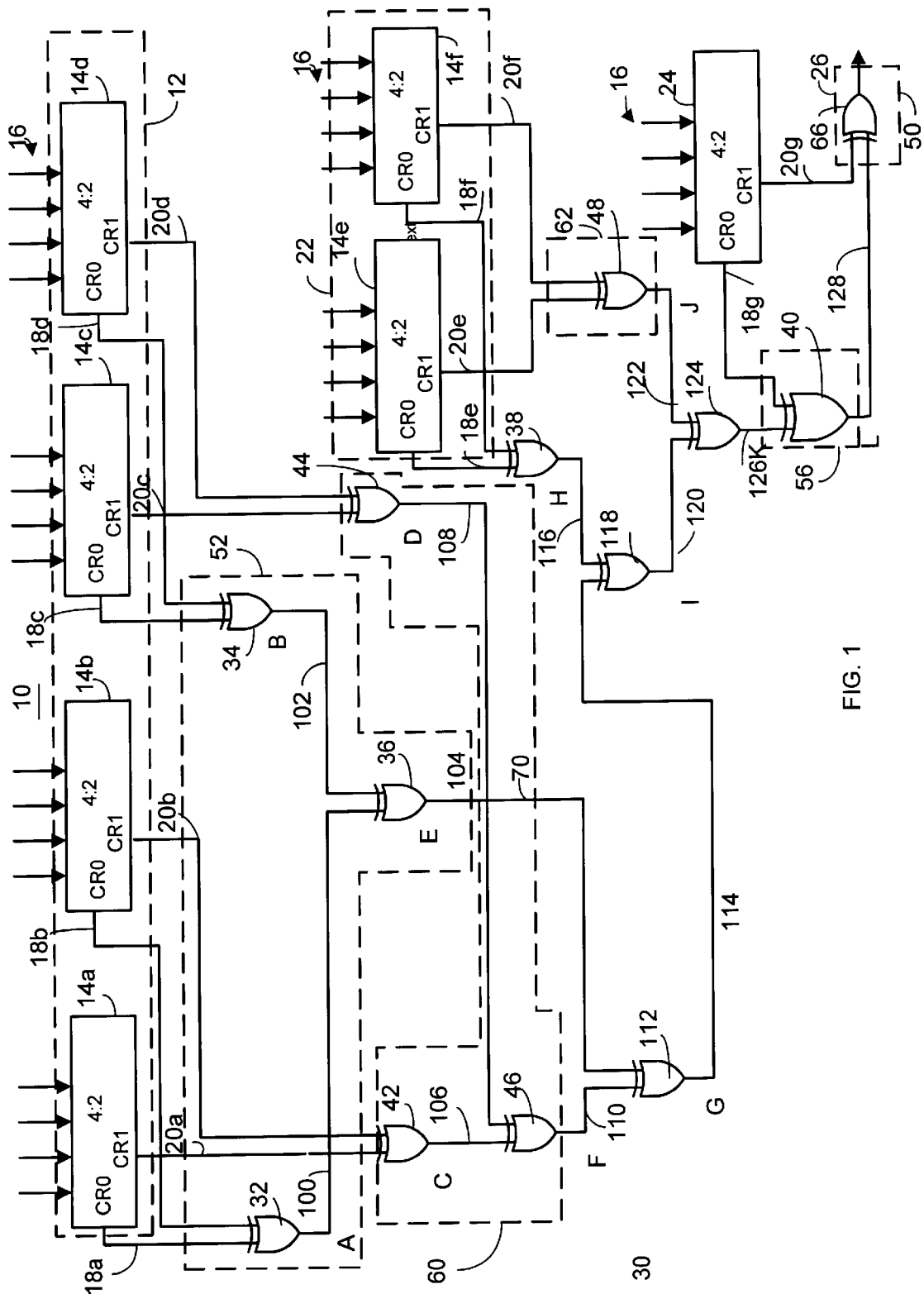
FIG. 1 is a block diagram of one example of a multiplier carry bit compression apparatus in accordance with one embodiment of the invention.

FIG. 1 illustrates an example of a multiplier section 10 using Wallace tree addition structures. The Wallace tree structure is shown having three levels wherein a first level uses a partial product processor 12 having four 4:2 compressors (addition structures) as known in the art. Each 4:2 compressor 14a–14d receives partial product inputs generally shown at 16 and output an early carry bit 18a–18d and a late carry bit 20a–20d as known in the art. A second level partial products processor 22 includes two 4:2 compressors 14e and 14f, each outputting an early carry bit 18e, and 18f, as well as a late carry bit 20e and 20f. A third level partial product processor 24 receives partial products 16 and outputs early carry bit 18g and late carry bit 20g. The multiplier 10 outputs a final carry bit 26 for a multiplication operation.

The multiplier 10 includes a multiplier carry bit compression apparatus generally indicated at 30 that includes a plurality of early carry bit compression circuits, such as logic exclusive OR (XOR) circuits 32 for each level of the Wallace tree addition structures. The early carry bit compression circuits 32, 34 and 36 make up a first level early carry bit compression circuit 52. A second level early carry bit compression circuit 54 includes early carry bit compression circuit 38. A third level early carry bit compression circuit 56 includes early carry bit compression circuit 40. Early carry bit compression circuit 36 serves as an intermediate early carry compression circuit that produces a reduced early carry result bit 104 from a plurality of early carry bits from different additional structures in the first level. However, it will be recognized that any suitable compression circuits may be used. These plurality of early carry bit compression circuits are indicated as circuits 32, 34, 36, 38 and 40. In addition, the multiplier carry bit compression apparatus 30 includes a plurality of late carry bit compression circuits for each level of the Wallace tree addition structure. These plurality of late carry bit compression circuits are indicated as XOR circuits 42, 44, 46, 48 and 50. For each of at least the first two levels, each early carry bit compression circuit compresses the early compression bits 18a–18f prior to each corresponding late carry bit compression circuit of the same level performing compression on the associated late carry bits 20a–20f. In the preferred embodiment, for each of all three levels, each early carry bit compression circuit for a given level compresses early compression bits prior to each corresponding late carry bit compression circuit compressing the late carry bit for that level. As such, the timing of the final carry bit is performed in an efficient manner.

A first level late carry bit compression circuit 60 includes late carry bit compression circuits 42, 44 and 46. A second level late carry bit compression circuit 62 includes late carry bit compression circuit 48. A third level late carry bit compression circuit 66 includes late carry bit compression circuit 50. A shown, a third level late carry bit compression circuit 50 is operatively coupled to the third level early carry bit compression circuit 56 by receiving an output therefrom. The third level late carry bit compression circuit 50 produces (i.e., generates) the final carry bit 26 for a multiplication operation.

As shown in FIG. 1, each of the four first Wallace compression circuits 14a–14d output respective early carry bits and late carry bits. The first level early carry bit compression circuit 52 includes in this embodiment, a first XOR circuit 32 operatively coupled to receive at least one early carry bit from the first and second first level Wallace compression circuits 14a and 14b, respectively. The first XOR circuit generates a first first level intermediate early carry result bit 100. A second XOR circuit 34 is operatively coupled to receive at least one early carry bit from the third and fourth first level Wallace compression circuits 14c and 14d and generates a second first level intermediate early carry result bit 102. A third XOR circuit 36 is operatively coupled to the first and second XOR circuits 32 and 34. The third XOR circuit 36 receives the first and second first level intermediate early carry result bits 100 and 102 and generates a reduced early carry result bit 104. It is considered a reduced early carry result bit since the bits 100 and 102 are compressed into a single bit 104.

The first level late carry bit compression circuit 60 includes a fourth XOR circuit 42 that is operatively coupled to receive at least one late carry bit from each of the first and second first level Wallace compression circuits 14a and 14b. The XOR circuit 42 also generates a first first level intermediate late carry result bit 106. A fifth XOR circuit is operatively coupled to receive at least one late carry bit from each of the third and fourth first level Wallace compression circuits 14c and 14d. This XOR circuit 44 generates a second first level intermediate late carry result bit 108. A sixth XOR circuit is operatively coupled to receive the first and second first level intermediate late carry result bits 106 and 108. This XOR circuit is shown as XOR circuit 46. The XOR circuit generates a reduced late carry result bit 110. A seventh XOR circuit 112 is operatively coupled to produce a finial first level carry bit 114 from the reduced early carry result bit 104 and the reduced late carry result bit 110.

A second level partial products processing circuit includes, in this example, the first and second second level Wallace compression circuits 14e and 14f along with an eighth XOR circuit 38 operatively coupled to receive at least one second level early carry bit from each of the first and second second level Wallace compression circuits 14e and 14f. The XOR circuit (compression circuit) 38 generates a first second level intermediate early carry result bit 116. A ninth XOP, circuit 118 is operatively coupled to produce a second level intermediate early carry result bit 1 16. A tenth XOR circuit 48 is operatively coupled to receive at least one second level late carry bit from each of the first and second second level Wallace compression circuits 14e and 14f to produce a first second level late carry result bit 122. An eleventh XOR circuit 124 is operatively coupled to produce a finial first and second level carry result bit 126 from the second level intermediate early carry result bit 120 and the first second level late carry result bit 122.

A third level partial products processing circuit includes the third level Wallace compression circuit 24 and also includes XOR circuit 40 operatively coupled to receive a third level early carry bit 18g and a final first and second level carry result bit 126 to produce a final second and third level carry result bit 128. Another XOR circuit 50 is operatively coupled to receive a final second and third level carry bit 128 and a third level late carry bit 20g to produce the final most significant bit (MSB) carry out bit 26. As used herein, it will be recognized that the word "coupled" is defined as "having an interaction with" and can include direct connection, indirect connections, or interactions having no intermediate medium, such as electromagnetic wave interactions, or any other suitable coupling. It will be recognized that the system shown in FIG. 1 may be implemented in software, hardware, or any suitable combination thereof if desired.

Figure 2A:
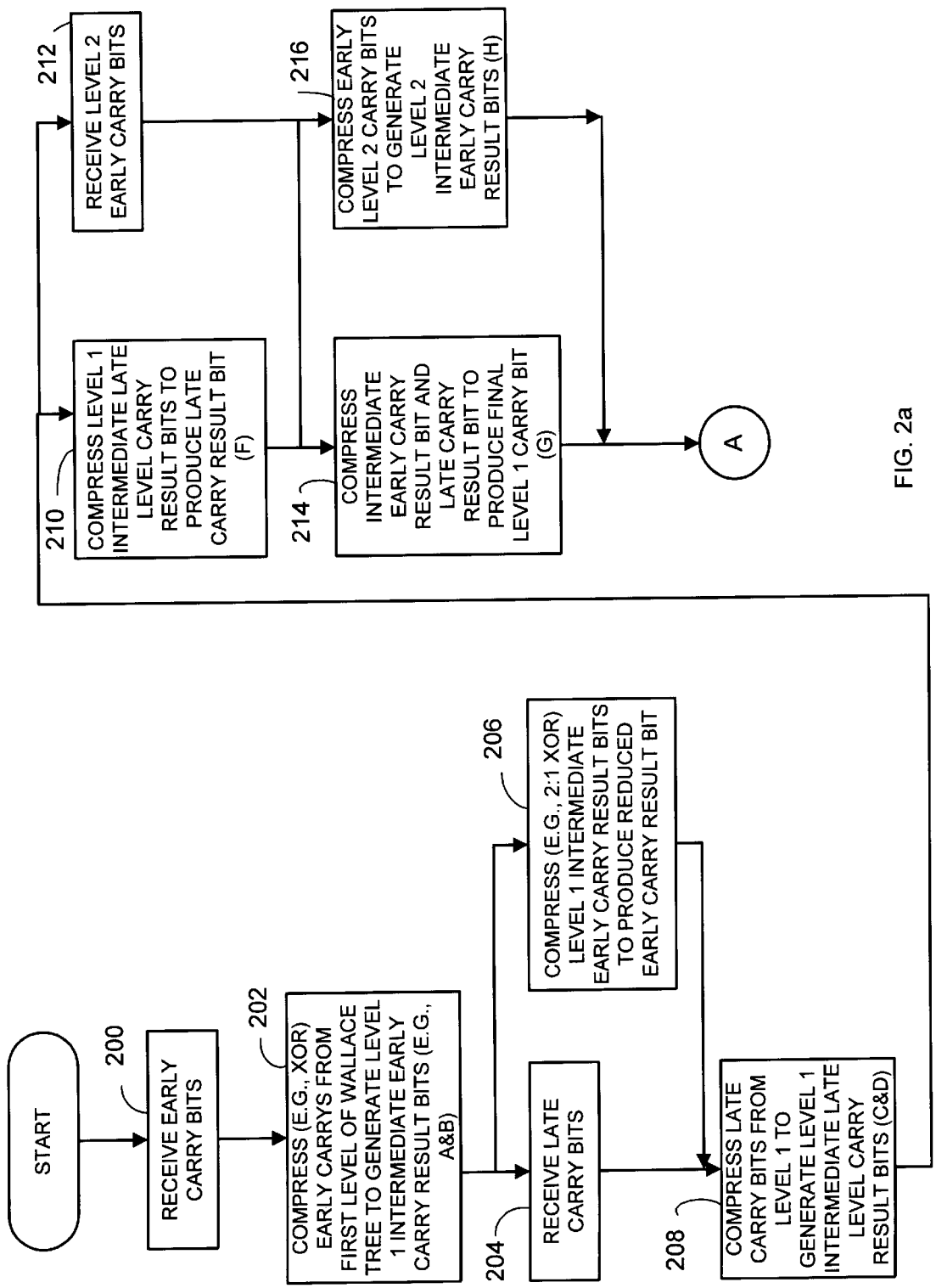
FIG. 2a is one portion of a method of operation of the multiplier carry bit compression apparatus shown in FIG. 1.
Figure 2B:
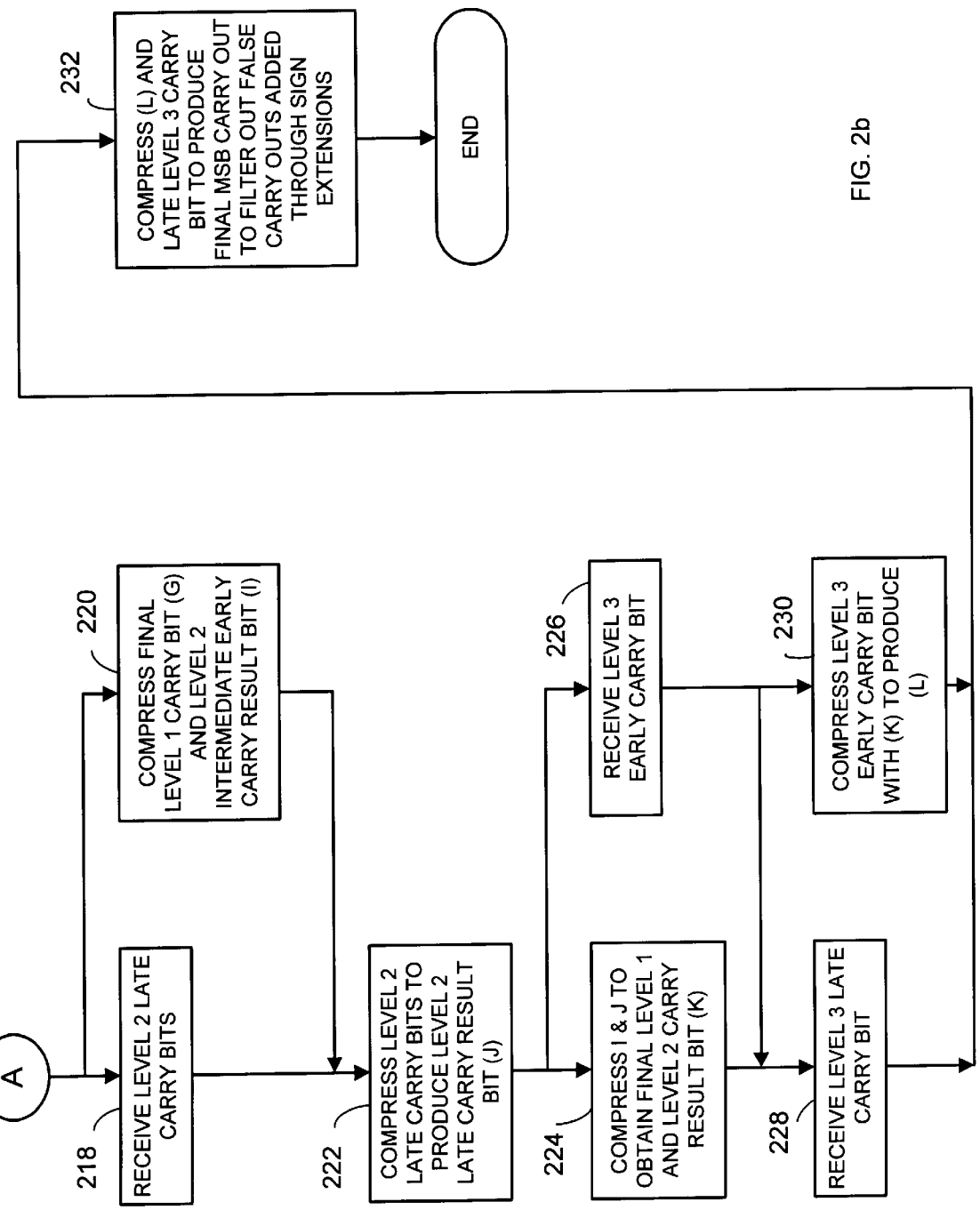

As shown in FIGS. 2a and 2b, in operation, the multiplier carry bit compression apparatus 30 receives early carry bits as shown in block 200. As shown in block 202, a method of operation includes compressing, in this example, using an XOR operation, the early carry bits from the first level of the Wallace tree to generate the first level intermediate early carry result bits 100 and 102, for example. Next, data representing the late carry bits and are received. For example, the late carry bits may be received through (or at the same time as compressing the early carry bits from the first level of the Wallace tree) the circuit 60 as shown in block 204. As shown in block 206, the system performs 2:1 compression for an intermediate early carry result bits to produce the reduced early carry result bit 104, for example.

As shown in block 208, the apparatus compresses the late carry bits from the first level to generate first level intermediate late level carry result bits 106 and 104. Next, as shown in block 210, the multiplier carry bit compression apparatus 130 compresses the first level intermediate late level carry result bits to produce the late carry result bit 110. Concurrently, the second level early carry bits 183 and 18f, are received by compressor 38 as shown in block 212. As shown in block 214, the intermediate early carry result bit and the late carry result bit are compressed to produce the final first level carry bit 114. As shown in block 216, concurrently, the system compresses the early second level carry bits to generate second level intermediate early carry result bit 116.

Referring to FIG. 2b, as shown in block 218, the next, second level late carry bits are received in compressor 48. The apparatus concurrently compresses the final first level carry bit 114 and the second level intermediate early carry result bit 116 to produce bit 120. This is shown in block 220. As shown in block 222, the system next compresses the second level late carry bits to produce the second level late carry result bit 122, as shown in block 224. Concurrently, as shown in block 226, the third level early carry bit is received in compressor 40. As shown in block 228, the third level late carry bit 20g is received in compressor 50. As shown in block 230, concurrently, the apparatus compresses the third level early carry bit 18g with bit 126 to produce bit 128. Finally, as shown in block 232, the system compresses bit 128 and the late third level carry bit 20g to produce the final MSB carry out bit 26 to filter out false carry outs added through, for example, sign extensions.

Although the circuit 30 may be used in any suitable multiplier, it may find particular use in a system such as that disclosed in co-pending application entitled "A Selective Carry Boundary," filed on Jun. 19, 1998, having U.S. Ser. No. 09/099,850, and owned by instant Assignee. The circuit of FIG. 1, for example, may be substituted as circuit XOR 3 in FIG. 4 thereof.

By suitably controlling the timing and the compression of early and late carry bits as described herein an efficient and accurate multiplier configuration can be produced.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A multiplier carry bit compression apparatus for a multiplier using Wallace tree addition structures comprising:
   a plurality of early carry bit compression circuits with at least one early carry bit compression circuit for each level of the Wallace tree addition structures; and
   a plurality of late carry bit compression circuits with at least one late carry bit compression circuits for each level of the Wallace tree addition structures;
   wherein for each of at least a first two levels, each early carry bit compression circuit compresses early compression bits prior to each corresponding late carry bit compression circuit compressing late carry bits.

2. The apparatus of claim 1 wherein the plurality of early carry bit compression circuits includes:
   a first level early carry bit compression circuit; a second level early carry bit compression circuit; and a third level early carry bit compression circuit; and
   wherein the plurality of late carry bit compression circuits includes:
      a first level late carry bit compression circuit, operatively coupled to the first level early carry bit compression circuit; a second level late carry bit compression circuit operatively coupled to the second level early carry bit compression circuit; and a third level late carry bit compression circuit operative to generate a finial carry bit for a multiplication operation.

3. The apparatus of claim 2 including a first level partial products processing circuit including a first first level Wallace compression circuit, a second first level Wallace compression circuit, a third first level Wallace compression circuit and a fourth first level Wallace compression circuit and wherein the first level early carry bit compression circuit includes:
   a first XOR circuit operatively coupled to receive at least one early carry bit from the first and second first level Wallace compression circuits and to generate a first, first level intermediate early carry result bit;
   a second XOR circuit operatively coupled to receive at least one early carry bit from the third and fourth first level Wallace compression circuits and to generate a second first level intermediate early carry result bit; and
   a third XOR circuit operatively coupled to the first and second XOR circuits, that receives the first and second first level intermediate early carry result bits and generates a reduced early carry result bit; and wherein
   the first level late carry bit compression circuit includes:
      a fourth XOR circuit operatively coupled to receive at least one late carry bit from each of the first and second first level Wallace compression circuits and to generate a first, first level intermediate late carry result bit;
      a fifth XOR circuit operatively coupled to receive at least one late carry bit from each of the third and fourth first level Wallace compression circuits and to generate a second, first level intermediate late carry result bit;
      a sixth XOR circuit operatively coupled to the fourth and fifth XOR circuits, that receives the first and second first level intermediate late carry result bits and generates a reduced late carry result bit; and
      a seventh XOR circuit operatively coupled to produce a final first level carry bit from the reduced early carry result bit and the reduced late carry result bit.

4. The apparatus of claim 2 including a second level partial products processing circuit including a first second level Wallace compression circuit and a second, second level Wallace compression circuit, and wherein the second level early carry bit compression circuit includes:
   a first XOR circuit operatively coupled to receive at least one second level early carry bit from each of the first and second, second level Wallace compression circuits and to generate a first second level intermediate early carry result bit; and
   wherein the second level late carry bit compression circuit includes:
      a second XOR circuit operatively coupled to receive at least one second level late carry bit from each of the first and second second level Wallace compression circuits and to produce a first second level late carry result bit; and
   wherein the second level partial products processing circuit further includes:
      a third XOR circuit operatively coupled to produce a second level intermediate early carry result bit from a finial first level carry bit and the second, second level intermediate early carry result bit; and
      a fourth XOR circuit operatively coupled to produce a finial first and second level carry result bit from the second level intermediate early carry result bit and the first second level late carry result bit.

5. The apparatus of claim 2 including a third level partial products processing circuit including a third level Wallace compression circuit and wherein the third level early carry bit compression circuit includes:
   an XOR circuit operatively coupled to receive a third level early carry bit and a finial first and second level carry result bit and to produce a finial second and third level carry result bit; and
   wherein the third level late carry bit compression circuit includes:
      an XOR circuit operatively coupled to receive the finial second and third level carry result bit and a third level late carry bit to produce a finial most significant bit carry out bit.

6. The apparatus of claim 1 wherein the plurality of early carry bit compression circuits include at least one intermediate early carry compression circuit operative to produce a reduced early carry result bit from a plurality of early carry bits from a different addition structure in a first level.

7. The apparatus of claim 1 wherein the plurality of early and late carry bit compression circuits are comprised of exclusive OR circuits coupled to produce 2:1 compression.

8. A multiplier carry bit compression apparatus for a multiplier using Wallace tree addition structures comprising:
   a first level early carry bit compression circuit; a second level early carry bit compression circuit; and a third level early carry bit compression circuit;
   a first level late carry bit compression circuit, operatively coupled to the first level early carry bit compression circuit; a second level late carry bit compression circuit operatively coupled tot he second level early carry bit compression circuit; and a third level late carry bit compression circuit operative to generate a final carry bit for a multiplication operation;
   a first level partial products processing circuit including a first level Wallace compression circuit, a second first level Wallace compression circuit, a third first level Wallace compression circuit and a fourth first level Wallace compression circuit and wherein the first level early carry bit compression circuit includes:

a first XOR circuit operatively coupled to receive at least one early carry bit from the first and second first level Wallace compression circuits and to generate a first, first level intermediate early carry result bit;

a second XOR circuit operatively coupled to receive at least one early carry bit from the third and fourth first level Wallace compression circuits and to generate a second first level intermediate early carry result bit; and a third XOR circuit operatively coupled to the first and second XOR circuits, that receives the first and second first level intermediate early carry result bits and generates a reduced early carry result bit; and wherein the first level late carry bit compression circuit includes:

a fourth XOR circuit operatively coupled to receive at least one late carry bit from each of the first and second first level Wallace compression circuits and to generate a first, first level intermediate late carry result bit;

a fifth XOR circuit operatively coupled to receive at least one late carry bit from each of the third and fourth first level Wallace compression circuits and to generate a second, first level intermediate late carry result bit;

a sixth XOR circuit operatively coupled to the fourth and fifth XOR circuits, that receives the first and second first level intermediate late carry result bits and generates a reduced late carry result bit; and a seventh XOR circuit operatively coupled to produce a final first level carry bit from the reduces early carry result bit and the reduce late carry result bit.

9. The apparatus of claim 8 including a second level partial products processing circuit including a first second level Wallace compression circuit and a second, second level Wallace compression circuit, including:

a first XOR circuit operatively coupled to receive at least one second level early carry bit from each of the first and second, second level Wallace compression circuits and to generate a first, second level intermediate early carry result bit;

a second XOR circuit operatively coupled to produce a second level intermediate early carry result bit from a final first level carry bit and the second level intermediate early carry result bit;

a third XOR circuit operatively coupled to receive at least one second level late carry bit from each of the first and second, second level Wallace compression circuits and to produce a first, second level late carry result bit;

a fourth XOR circuit operatively coupled to produce a final first and second level carry result bit from the second level intermediate early carry bit and the first, second level late carry result bit.

10. The apparatus of claim 9 including a third level partial products processing circuit including a third level Wallace compression circuit and also including:

an XOR circuit operatively coupled to receive a third level early carry bit and a final first and second level carry result bit and to produce a final second and third level carry result bit; and another XOR circuit operatively coupled to receive the final second and third level carry bit and a third level late carry bit to produce a final most significant bit carry out bit.

11. A multiplier carry bit compression method for a multiplier using Wallace tree addition structures comprising the steps of:

sequentially compressing early carry bits for each consecutive level among differing levels formed by the Wallace tree addition structures; and compressing late carry bits for each respective level after first compressing corresponding early carry bits for each level to produce one final most significant bit as a carry out bit.

12. The method of claim 11 where the step of sequentially compressing early carry bits include the step of:

producing a reduced early carry result bit from a plurality of early carry bits from different addition structures in a first level.

13. The method of claim 11 wherein the step of sequentially compressing early carry bits includes the steps of:

compressing early carry bits from a first level of the Wallace Tree addition structures to generate first level intermediate early carry result bits; and compressing the intermediate early carry result bits to produce a reduced early carry result bit; and wherein the step of sequentially compressing late carry bits includes the steps of:

compressing late carry bits from the first level of the Wallace Tree addition structures to generate first level intermediate late level carry result bits; and compressing the first level intermediate late level carry result bits to produce a late carry result bit.

14. The method of claim 13 further comprising the step of:

compressing the late carry result bit and reduced early carry result bit to produce a finial first level carry bit.

15. The method of claim 14 further comprising the steps of:

compressing early second level carry bits from a second level of the Wallace Tree addition structures to generate a first second level intermediate early carry result bits; and compressing the finial first level carry bit with the second level intermediate early carry result bit to produce a second second level intermediate carry result bit.

16. The method of claim 15 further comprising the steps:

compressing second level late carry bits from a second level of the Wallace Tree addition structures to produce a second level late carry result bit; and compressing the second second level intermediate carry result bit with the second level late carry result bit to obtain finial level one and level two carry result bit.

17. The method of claim 16 further comprising the steps of:

compressing the finial level one and level two carry result bit with a third level early carry bit to produce a finial second and third level carry result bit; and compressing a third level late carry bit and the finial second and third level carry result bit to produce a finial most significant bit carry out bit.

* * * * *